(12) United States Patent
Nonin (10) Patent No.: US 12,332,344 B2
(45) Date of Patent: Jun. 17, 2025

(54) METHOD FOR GEOREFERENCING OF A DIGITAL ELEVATION MODEL

(71) Applicant: AIRBUS DEFENCE AND SPACE SAS, Toulouse 4 (FR)

(72) Inventor: Philippe Nonin, Toulouse (FR)

(73) Assignee: AIRBUS DS GEO SA, Toulouse (FR)

( * ) Notice: Subject to any disclaimer, the term of this patent is extended or adjusted under 35 U.S.C. 154(b) by 428 days.

(21) Appl. No.: 17/920,621

(22) PCT Filed: Apr. 20, 2021

(86) PCT No.: PCT/EP2021/060164
§ 371 (c)(1),
(2) Date: Oct. 21, 2022

(87) PCT Pub. No.: WO2021/201401
PCT Pub. Date: Oct. 28, 2021

(65) Prior Publication Data
US 2023/0152443 A1   May 18, 2023

(30) Foreign Application Priority Data

Apr. 23, 2020 (FR) .................................... 2004044

(51) Int. Cl.
*G01S 13/90* (2006.01)
*G01S 13/46* (2006.01)

(52) U.S. Cl.
CPC ...... *G01S 13/9027* (2019.05); *G01S 13/9023* (2013.01); *G01S 2013/468* (2013.01)

(58) Field of Classification Search
CPC ............. G01S 13/9027; G01S 13/9023; G01S 2013/468
See application file for complete search history.

(56) References Cited

FOREIGN PATENT DOCUMENTS

| CN | 106646468 | | 4/2019 |
|---|---|---|---|
| JP | 3914256 B1 | * | 5/2007 |

OTHER PUBLICATIONS

Liu, Hongxing; Zhao, Zhiyuan; Jezek, Kenneth C.; Correction of Positional Errors and Geometric Distortions in Topographic Maps and DEMs Using a Rigorous SAR Simulation Technique; Photogrammetric Engineering & Remote Sensing, No. 9 / Sep. 2004, pp. 1031-1042(12) (Year: 2004).*
International Search Report for PCT/EP2021/060164, mailed Jul. 16, 2021, 6 pages.
Written Opinion of the ISA for PCT/EP2021/060164, mailed Jul. 16, 2021, 7 pages.
Hongxing Liu et al., "Correction of Positional Errors and Geometric Distortions in Topographic Maps and DEMs Using a Rigorous SAR Simulation Technique" Photogrammetric Engineering & Remote Sensing [H. W. Wilson-AST], Sep. 1, 2004, pp. 1031-1042.
Umut Gunes Sefercik et al., "Terrain Estimation Performance of Advanced SAR Satellites: Cosmo-SkyMed and TerraSAR-X" A 2017 8th International Conference on Recent Advances in Space Technologies (RAST), IEEE, Jun. 19, 2017, pp. 149-154.
Yanping Wang et al., "Ground-Based Differential Interferometry SAR: A Review" IEEE Geoscience and Remote Sensing Magazine, IEEE, USA, vol. 8, No. 1, Jan. 30, 2020, pp. 43-70.

* cited by examiner

*Primary Examiner* — Vladimir Magloire
*Assistant Examiner* — Bongani Jabulani Mashele
(74) *Attorney, Agent, or Firm* — Nixon & Vanderhye P.C.

(57) ABSTRACT

A method (100) for referencing a digital elevation model (10), involving a step of obtaining (110) two SAR images (12, 14) having a common area (15) that their area of overlap (16, 17) shares with the digital model (10); the method (100) involving, for the SAR images (12, 14), steps of: selecting (120) an AOI (18) in the common area (15); calculating (130) a simulated image (22) in the AOI (18); estimating (140) an offset (di,dj) between the simulated image (22) and the SAR image (12); the method (100) involving steps of selecting a reference point (26) in the AOI (18); projecting (160) the reference point (26) into the SAR images (12, 14) to obtain one connection point per SAR image (12, 14); correcting (170) the connection points by the offsets (di,dj); calculating (180) the readjusted reference point (26); referencing (190) the digital model (10).

11 Claims, 7 Drawing Sheets

METHOD FOR GEOREFERENCING OF A DIGITAL ELEVATION MODEL

RELATED APPLICATION

This application is the U.S. national phase of International Application PCT/EP2021/060164, filed Apr. 20, 2021, which designated the U.S. and claims priority to French patent application FR 2004044, filed Apr. 23, 2020, the entire contents of each of which are hereby incorporated by reference.

TECHNICAL FIELD OF THE INVENTION

The present invention relates to an advanced method for georeferencing digital elevation models. More particularly, the invention relates to a method for referencing digital models representing the globe surface from images captured from Earth's surface observation vehicles.

PRIOR ART

Digital terrain models are three-dimensional representations of the Earth's surface. A general distinction is made between Digital Terrain Models (DTMs), which represent the surface of a terrain created from altitude data of this terrain but without the ground surface elements that make it up (vegetation, infrastructure, etc.), and Digital Elevation Models (DEMs) or Digital Surface Models (DSMs), which represent the surface of the same terrain but with the ground surface elements included.

Digital elevation models can be generated from different techniques such as: photogrammetry, which uses stereoplotting techniques from a stereoscopic pair comprised of two optical images of the Earth's surface acquired by optical image sensors on board a satellite, a plane or any other aircraft; radar interferometry which uses SAR type radar images, that is, radar images acquired by synthetic aperture radar sensors, and in particular an interferometric SAR image pair acquired by synthetic aperture radar sensors on board a satellite or a plane.

The accuracy of the digital elevation models obtained by these different techniques and the uncertainties in the measurements are highly dependent on the accuracy of the acquisition means and the data used as input to these techniques.

The use of the latest generation of very high resolution optical sensors in a stereoplotting method makes it possible to produce digital models with a relative accuracy in the order of one metre. However, the absolute accuracy is limited by the uncertainty of the shooting conditions of these optical images. Indeed, it is very difficult to determine with sufficient accuracy the orientation of an optical sensor on board a satellite. The accurate estimation of this orientation at the time of shooting is therefore carried out a posteriori, but this presupposes the knowledge of reference points, called ground control points (GCP), whose position on the terrain is known.

The relative accuracy of digital elevation models obtained by radar interferometry is also high in the case of high resolution acquisitions. Radar interferometry consists in using a pair of SAR-type radar images acquired simultaneously by two antennas close to each other (a few tens to a few hundreds of metres). A distinction is made between the monostatic case, where both antennas independently transmit and receive their own echo, and the bi-static case, where only one antenna transmits a signal whose echo is then received by both. The difference observed between the phase of the two received echoes indicates the difference (modulo the wavelength) in the distances between the antennas and the target point, which, given the position of the antennas and the distance measured by each of them, allows the point to be located in 3D. However, the absolute accuracy of the measurement depends on the orientation of the interferometric base, that is, the line connecting the two antennas. If the relative position of the antennas is known with a small uncertainty, for example a few millimetres, this is not sufficient to know the orientation of the interferometric base with the required accuracy. For example, three millimetres on a 300 m base induces 10 microradians of uncertainty, that is, 7 metres on the terrain at 700 km.

It is therefore necessary to find a method to improve the geometric accuracy of digital elevation models obtained by radar interferometry or photogrammetry based on very high resolution optical images. It is also necessary to find a method that is as automated as possible and that does not require the use of a database of specific referencing points.

DISCLOSURE OF THE INVENTION

The present invention aims at overcoming the drawbacks of known methods for georeferencing digital elevation models with a completely new approach.

To this end, according to a first aspect, the present invention relates to a method for georeferencing a digital elevation model of the Earth's surface comprising a first step of obtaining at least two synthetic aperture radar images, called reference radar images, the footprint of each reference radar image including a zone common to the zone of overlap with the footprint of at least one other of the at least two reference radar images and with the digital elevation model.

The method further includes, for each reference radar image, the steps of: selecting at least one area of interest on the common zone; calculating a simulated radar image on the at least one selected area of interest from the acquisition parameters of the reference radar image; estimating a geometric offset between the simulated radar image and the reference radar image.

The method then comprises the steps of selecting at least one referencing point on the at least one selected area of interest from the digital elevation model, the at least one referencing point including coordinates in the frame of reference of the digital elevation model; projecting said at least one referencing point into each of the at least two reference radar images by a radar projection function relating to each image so as to obtain at least one radar link point relating to each of the at least two reference radar images; correcting the at least one radar link point of each of the at least two reference radar images by applying said geometric offset estimated for each of the reference radar images so as to obtain at least one corrected radar link point relating to each reference radar image; calculating the reset terrain coordinates of the at least one referencing point by applying a triangulation process implementing said at least two reference radar images from the at least one corrected link point relating to each reference radar image; and georeferencing the digital elevation model by transformation as a function of the deviations found between the reset terrain coordinates and the terrain coordinates in the frame of reference of the digital elevation model.

The invention is implemented according to the embodiments and the alternatives disclosed below, which are to be considered individually or according to any technically effective combination.

Advantageously, the step of estimating the geometric offset between the simulated radar image and the reference radar image may comprise maximising the conditional probability of the offset knowing the reference radar image considered.

Advantageously, the step of calculating the simulated radar image may comprise determining an average reflectance factor of the reference SAR image calculated on the area of interest considered for calculating said simulated SAR image.

Advantageously, each selected area of interest may represent a restricted zone of the common zone.

Advantageously, the step of selecting at least one area of interest may be a selection of at least one zone of interest per fifty-kilometre interval, along a North-South axis.

Advantageously, during the step of obtaining at least two reference radar images, radar images acquired by any synthetic aperture radar satellite in opposite viewing directions may be selected.

Advantageously, the digital elevation model may be derived from an interferometric pair of synthetic aperture radar images and one of the images of this interferometric pair is chosen during the step of obtaining at least two reference radar images. According to this hypothesis, the step of calculating a simulated radar image and the step of estimating a geometric offset can relate only to the other reference radar images of the at least two reference radar images obtained, the step of correcting the at least one radar link point of the reference radar image corresponding to one of the images of the interferometric pair includes a zero geometric offset.

According to a second aspect, the present invention relates to a system for georeferencing the digital elevation model: implementing the method described above including an information processing unit and a random-access memory associated with the information processing unit, said random access memory comprising instructions for implementing the method, said information processing unit being configured to execute the instructions implementing the method.

According to a third aspect, the present invention relates to a computer program product comprising instructions which, when the program is executed by a computer, cause the computer to implement the steps of the method for georeferencing a digital elevation model described above.

According to a fourth aspect, the present invention relates to an information storage medium storing a computer program comprising instructions for implementing, by a processor, the method described above, when said program is read and executed by said processor.

BRIEF DESCRIPTION OF THE FIGURES

Further advantages, purposes and characteristics of the present invention will be apparent from the following description made, for explanatory and non-limiting purposes, with reference to the appended drawings, in which.

DESCRIPTION OF THE EMBODIMENTS

Figure 1:
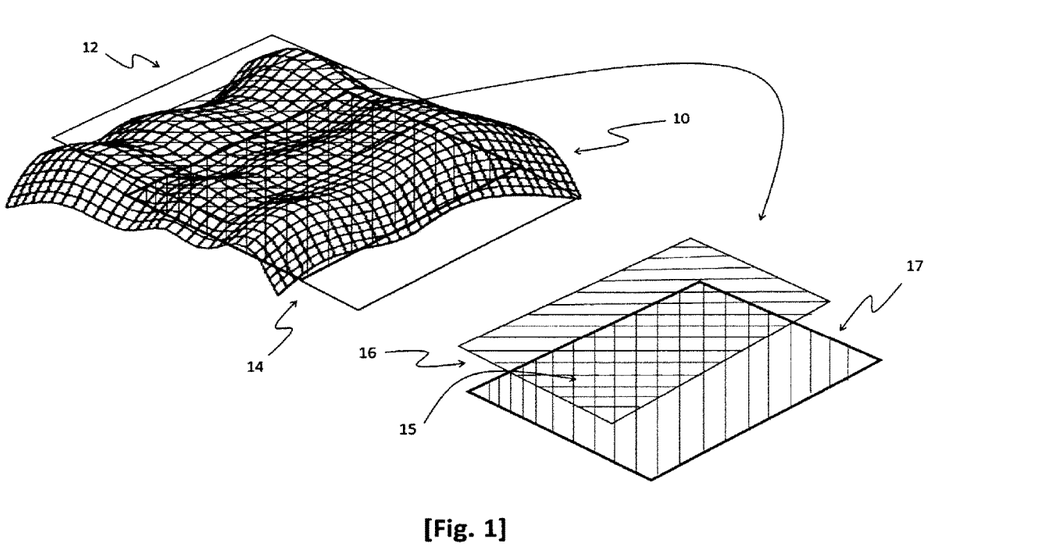
FIG. 1 is a schematic representation of a common zone of overlap between a digital elevation model and two reference SAR images according to a first embodiment of the invention.

According to FIG. 1, a method for georeferencing a digital elevation model (DEM) 10 comprises a digital elevation model 10 representing the surface of a terrain and the ground surface elements of the terrain. The digital elevation model 10 may have been obtained, for example and without limitation, by a radar interferometry method or by a photogrammetry method using stereoplotting techniques from a stereoscopic pair comprised of two optical images of the Earth's surface, or by any other method for generating a digital elevation model 10 representative of the globe surface. By digital elevation model 10 or surface model it is meant any three-dimensional model representing a portion of the globe surface. The format of the digital elevation model 10 according to the invention is immaterial. Any format is applicable, such as, for example, and without limitation, an altitude grid, a three-dimensional point cloud, a triangulated irregular network (TIN), or any surface mesh.

According to FIG. 1, the method for georeferencing a digital elevation model 10 comprises obtaining at least two radar images acquired by one or two synthetic aperture radar sensors. Although FIG. 1 is represented with two radar images 12, 14, it will be understood according to the invention that the georeferencing method can be carried out with a plurality of reference SAR images. In the following description, a reference SAR image is used to refer to a reference radar image acquired by a synthetic aperture radar sensor. As a non-limiting example, the at least two reference SAR images 12, 14 may come from an SAR image database.

According to the invention, the footprint of each of the at least two reference SAR images 12, 14 covers all or part of the terrain surface covered by the digital elevation model 10. For the remainder of the disclosure, the zone corresponding to the intersection between the footprint of a reference SAR image 12, 14 and the geographical zone covered by the digital elevation model 10 will be referred to as the zone of overlap 16, 17. More particularly, the footprint of the at least two reference radar images 12, 14 includes a zone 15 common to the zone of overlap 16, 17 with the footprint of at least one other of the at least two reference radar images 12, 14 and with the digital elevation model 10.

Preferably, particular attention should be paid to the stereoscopic ratio, that is, the base-to-height (B/H) ratio of the triangle formed by the two sensors and the scene observed. To this end, these two reference SAR images 12, 14 should have been acquired from sufficiently distant positions so as to benefit from a stereoscopic angle B/H favourable to the triangulation of points extracted and reset by the present method. The use of SAR images acquired by any synthetic aperture radar satellite on the zone considered along opposite viewing directions constitutes a sufficient geometric configuration to obtain a stereoscopic angle B/H adapted to the present method. Thus, according to a first example, the use of at least one SAR image acquired by a synthetic aperture radar satellite on the zone considered in an eastward-oriented viewing direction and at least one SAR image acquired by a synthetic aperture radar satellite on the zone considered in a westward-oriented viewing direction may be cited as a sufficient geometric configuration to obtain a stereoscopic angle (B/H) adapted to the present method. According to another example relating to the TerraSAR-X synthetic aperture radar satellite, the use as reference SAR images of an SAR image acquired by the satellite in ascending mode on the zone considered and another SAR image acquired by the satellite in descending mode on the zone considered, according to the direction of passage of the satellite, is also a sufficient geometric configuration to obtain a stereoscopic angle B/H adapted to the present method. The reference SAR images 12, 14 can therefore be selected from an SAR image database according to the required criteria of stereoscopic angle B/H and ground coverage relative to the digital elevation model 10.

Alternatively, when the digital elevation model 10 has been obtained by a radar interferometry method, one of the reference SAR images 12 may be one of the images from the interferometric pair of SAR images from which the digital elevation model 10 was derived. In this case, the other image of the interferometric pair cannot be used because of the small stereoscopic angle B/H responsible for the uncertainty of the digital elevation model 10.

Figure 2:
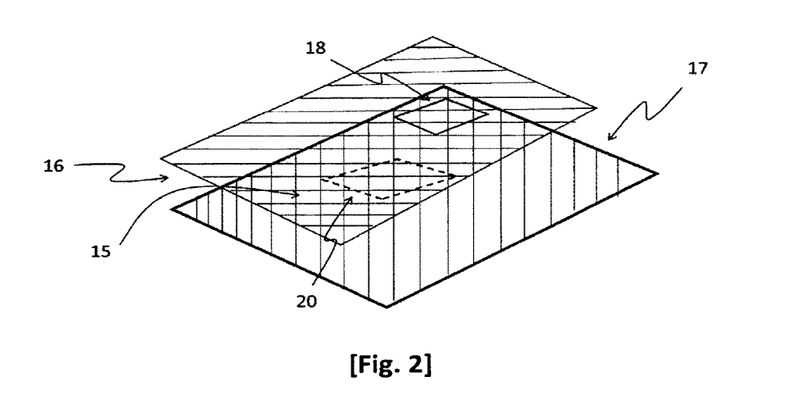
FIG. 2 is a schematic representation of selecting two areas of interest on the common zone of FIG. 1.

According to FIG. 2, the method for georeferencing a digital elevation model 10 comprises selecting at least one area of interest 18, commonly referred to as AOI, on the zone 15 common to the zone of overlap 16, 17 of the at least two reference SAR images 12, 14 with the digital elevation model 10, that is, on the zone constituted by the intersection of the footprint of the at least two reference SAR images 12, 14 with the footprint of the digital elevation model 10.

The number of areas of interest 18 necessary for the method for georeferencing a digital elevation model 10 may depend on the complexity of the ground deformation caused by the errors in the digital elevation model 10 that are expected to be observed. Selecting a single area of interest 18 may be sufficient to estimate a translation of the digital elevation model 10 in all three dimensions of space, in other words, a simple offset may be measured with a single area of interest.

If the sensor(s) used to acquire the images from which the digital elevation model 10 is derived have been subjected to a greater number of degrees of freedom of motion resulting in complex deformations in each image, then it is advantageous to select a plurality of areas of interest 18, 20. In other words, a greater number of degrees of freedom results in more complex deformations that require more independent areas of interest 18, 20 to measure. As a non-limiting example, in the case of a digital elevation model 10 derived from an interferometric pair, since variations in the orientation of the interferometric base can result in deformations developing along the North-South axis, selecting at least one area of interest 18 per fifty-kilometre interval and along this North-South axis may be necessary.

Selecting the at least one area of interest 18 may be performed by an operator as well as automatically. Selecting areas of interest may take the nature of the terrain into account, especially, for example and without limitation, so as to avoid bodies of water, as the backscattered electromagnetic energy of synthetic aperture radars on bodies of water is not predictable.

The selection mode of at least one area of interest 18 does not preclude the alternative that a single area of interest representative of the entire common zone 15 may be selected.

Figure 3:
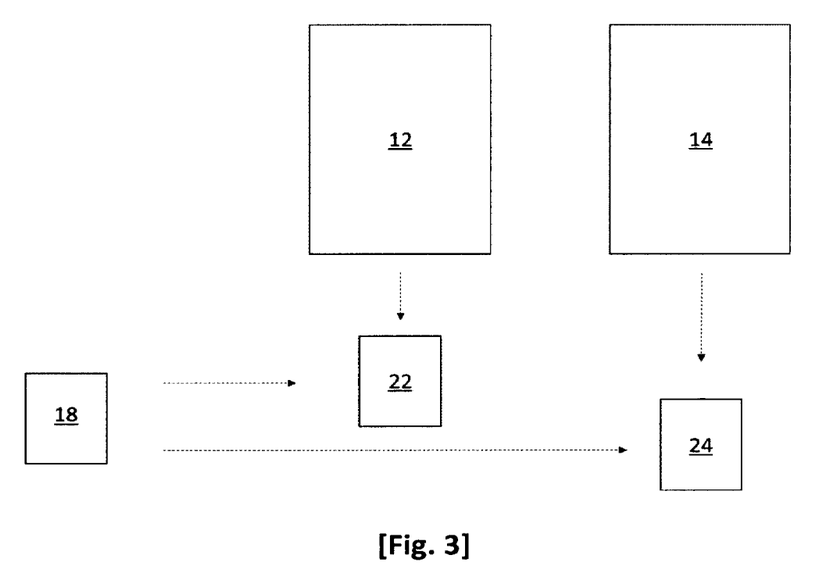
FIG. 3 is a schematic representation of obtaining simulated radar images from the area of interest selected in FIG. 2 and the two reference SAR images of FIG. 1.

According to FIG. 3, the method for georeferencing a digital elevation model 10 requires determining, for the at least two reference SAR images 12, 14, at least two simulated SAR images 22, 24 corresponding to the at least two reference SAR images 12, 14, on the at least one selected area of interest 18 and from the acquisition parameters of each of the at least two reference SAR images 12, 14. More particularly, according to FIG. 3, the acquisition parameters of each of the at least two reference SAR images 12, 14 in combination with the at least one selected area of interest 18 on the zone 15 common to the zone of overlap 16, 17 of the at least two reference SAR images 12, 14 with the digital elevation model 10 allow the determination of the at least two simulated SAR images 22, 24.

Determining each of the simulated SAR images 22 takes into account that the average electromagnetic energy backscattered on the terrain surface modelled by the digital elevation model 10 depends on the angle of incidence of the SAR radar sensor of the reference SAR image 12 on the terrain modelled by the digital elevation model 10 according to a geometric configuration of the SAR radar sensor. In other words, the average backscattered electromagnetic energy also depends on the orientation of the terrain modelled by the digital elevation model 10 relative to the incident wavefront that would have been emitted by the SAR radar sensor. More particularly, knowing the area of interest 18 and the geometric configuration of the SAR radar sensor with respect to the modelled terrain, the average electromagnetic energy backscattered from any surface element of the terrain modelled by the first digital elevation model 10, that is, the radiation of the radar wave that would have been emitted by the SAR radar sensor on the modelled terrain surface, can be calculated to within a multiplicative constant. It should also be noted that a sufficiently fine triangulated representation of the relief modelled by the digital elevation model 10, allows the wave/surface interaction and its representation in each of the simulated SAR images 22 to be faithfully simulated.

To this end, the backscattered energy recorded in a reference SAR image 12 depends on a coefficient strongly related to the angle of the incident wave from the SAR radar sensor on the terrain, the coefficient being determined according to the following formula, $$\frac{C \times R}{\sin(i)},$$

where i represents the angle of the incident wave on the terrain modelled by the first digital elevation model 10, 'C' is a proportionality factor depending on the characteristics of the SAR radar sensor such as, for example and without limitation, the distance between the SAR radar sensor and the terrain, as well as the antenna gain, R represents the reflectance of the surface of the terrain at the point considered. According to the invention, a constant reflectance factor R should be estimated over the entire terrain represented by the digital elevation model 10. More particularly, the reflectance factor R used for calculating each simulated SAR image 22, 24 is an average reflectance factor of the reference SAR image 12 calculated over the whole footprint of the simulated SAR image 22, that is, on the area of interest 18 considered for calculating said simulated SAR image 22.

The method for georeferencing a digital elevation model 10 requires estimating a geometric offset di,dj of each simulated SAR image 22 relative to each corresponding reference SAR image 12, that is, relative to each reference SAR image 12 used for calculating each simulated SAR image 22.

It is known from prior art that the geometric offset between two images comprising a zone of overlap can be estimated using a correlation product approach between the two images. The application of the correlation product approach is a generic approach that applies to both optical and radar images.

According to the invention, preferably a new method or process for estimating each offset di,dj between each simulated SAR image 22 and its corresponding reference SAR image 12, in the frame of reference $O_{sar\_refl}$, $I_{sar\_refl}$, $J_{sar\_refl}$ of each corresponding reference SAR image 12 has been developed. This approach is particularly adapted in the context of SAR images 12, 14.

To this end, the new method for estimating the offset di,dj according to the invention comprises estimating the geometric offset di,dj by maximising the conditional probability of the offset di,dj knowing the reference SAR image 12. The conditional probability of the geometric offset di,dj knowing the reference SAR image 12 is denoted as P(di,dj/SAR). According to Bayes theorem, the conditional probability of the geometric offset di,dj knowing the reference SAR image 12 is calculated according to the formula:

P(di,dj/SAR)=P(SAR/di,dj)*P(di,dj)/P(SAR)     (1)

In the context of the invention, the a priori probability P(di,dj) is assumed to be constant over a finite interval [−i, +i] [−j, +j], the a priori probability P(di,dj) being zero beyond the bounds of the finite interval. The bounds of the finite interval [−i, +i] [−j, +j] are determined by the maximum uncertainty in the location of the digital elevation model 10. They represent the bounds of a rectangle encompassing the projection, for each reference SAR: 12, 14, of the volume of uncertainty of the digital elevation model 10 assumed to be equally distributed and independent on the three axes of the digital elevation model 10.

This maximum a priori uncertainty is translated into the maximum offset of the simulated SAR image 22 by means of the localisation function of the reference SAR image 12, that is, by means of the projection of the terrain modelled by the digital elevation model 10 into the reference SAR image 12.

In the context of the invention, it is also noticed that the a priori probability P(SAR) does not depend on the geometric offset di,dj. This amounts to saying that the operation of maximising the conditional probability P(di,dj/SAR) of the geometric offset di,dj knowing the reference SAR image 12 is therefore equivalent to maximising P(SAR/di,dj) over the previously defined finite interval [−i, +i] [−j, +j]. This latter conditional probability P(SAR/di,dj) amounts to estimating the probability of the reference SAR image 12, knowing the statistical expectation of the backscattered energy at each pixel. It should be noted that the expectation of the backscattered energy was determined a priori for each pixel when determining the simulated SAR image 12 from the digital elevation model 10.

Accordingly, given that the residual fluctuations are statistically independent from one pixel of the reference SAR image 12 to the next, the conditional probability P(SAR/di,dj) can be decomposed according to the following formula representative of the product of the probabilities $P_{ai}$ of the statistical expectations of the backscattered energy $a_i$ for each pixel i of the simulated SAR image 22:

P(SAR/di,dj)=$\Pi_i P_{a_i}(v_i)$     (2)

According to the formula, $v_i$ represents the amplitude of pixel i of the reference SAR image 12. It should be noted that the distribution Pa (v) is well described by a Nakagami law, and for an SAR image, called a multi-look or N-look SAR image, this law is given by the formula:

$$P_a(v) = 2v^{2N-1}e^{-Nv^2/a}\frac{N^N}{(a^N(N-1)!)} \quad (3)$$

In the particular case of a 'single-look' image, this expression is reduced to the well-known Rayleigh law whose formula is:

$$P_a(v) = \frac{2ve^{-v^2/a}}{a} \quad (4)$$

Estimating the geometric offset or geometric correction di,dj for the area of interest 18, then amounts to determining the maximum value among all the values of the conditional probability P(SAR/di,dj) calculated over the previously predefined interval [−i, +i] [−j, +j].

It should be noted that the reference SAR image 12 used by the present method may be either a single-look SAR image or a multi-look SAR image. The multi-look SAR image is a technique for a posteriori processing a radar image to reduce the presence of multiplicative noise in the image, called speckle, due to the nature of the radar signal measured by the sensor at the time of acquisition.

Figure 4:
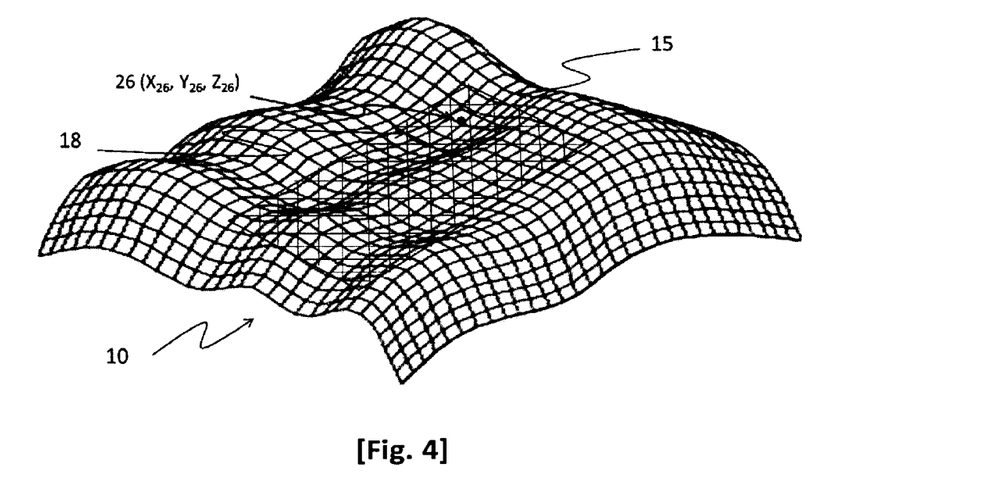
FIG. 4 is a schematic representation of selecting a referencing point on the area of interest selected in FIG. 2.

According to FIG. 4, the method for georeferencing the digital elevation model 10 requires selecting at least one three-dimensional point 26, called a referencing point, on the at least one selected area of interest 18 from the digital elevation model 10. According to FIG. 4, the at least one referencing point 26 selected on the digital elevation model 10 includes 3D coordinates $X_{26}$, $Y_{26}$, $226$ relating to the frame of reference of the digital elevation model 10.

Figure 5:
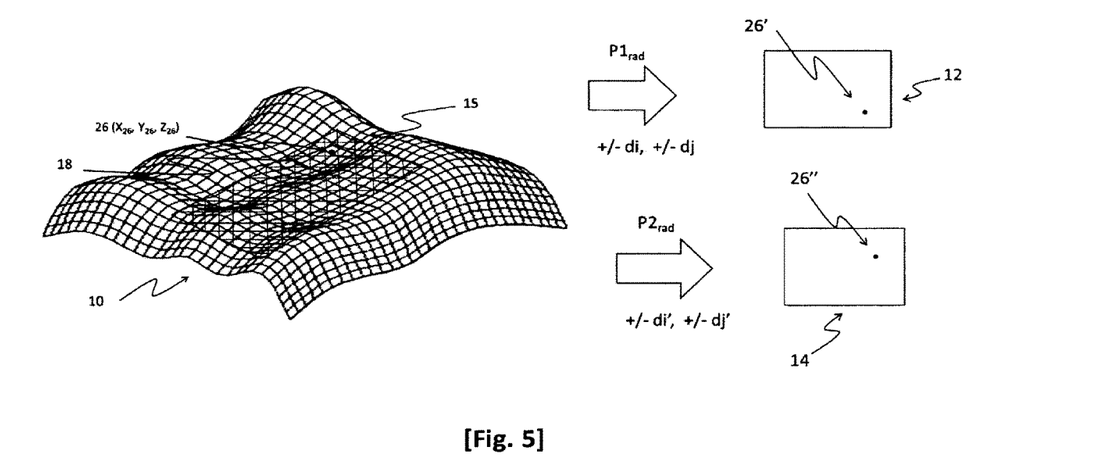
FIG. 5 is a schematic representation of determining a pair of link points in the two reference radar images by projecting the referencing point of FIG. 4.

According to FIG. 5, the method for georeferencing the digital elevation model 10 requires determining at least one link point on each of the at least two reference SAR images 12, 14, from the at least one referencing point 26 selected on the at least one area of interest 18.

To this end, for each of the at least two reference SAR images 12, 14, a radar projection function $P1_{rad}$, $P2_{rad}$ is defined, the at least two radar projection functions $P1_{rad}$, $P2_{rad}$ taking the radar acquisition parameters into account, such as for example and without limitation, the trajectory of the SAR radar sensor, used to acquire each of the at least two corresponding reference SAR images 12, 14. Each radar projection function $P1_{rad}$, $P2_{rad}$ makes it possible to determine at least one radar link point for each of the at least two reference SAR images 12, 14. According to the invention, applying the geometric offset di,dj of each of the at least two simulated SAR images 22, 24 relative to each of the at least two reference SAR images 12, 14 to the coordinates of the at least one radar link point of each of the at least two reference SAR images 12, 14 makes it possible to obtain the coordinates $I_{sar\_refl\_26}'$, $J_{sar\_refl\_26}'$, $I_{sar\_ref2\_26}''$, $J_{sar\_ref2\_26}''$ of at least one link point, called the at least one corrected radar link point 26', 26'' in each of the at least two reference SAR images 12, 14 necessary for the method for georeferencing the digital elevation model 10.

According to FIG. 5, the method for georeferencing the digital elevation model 10 has made it possible to determine the correspondence of the at least one selected referencing point 26 on the digital elevation model 10 and, in the frame of reference of each of the at least two reference SAR images 12, 14.

Figure 6:
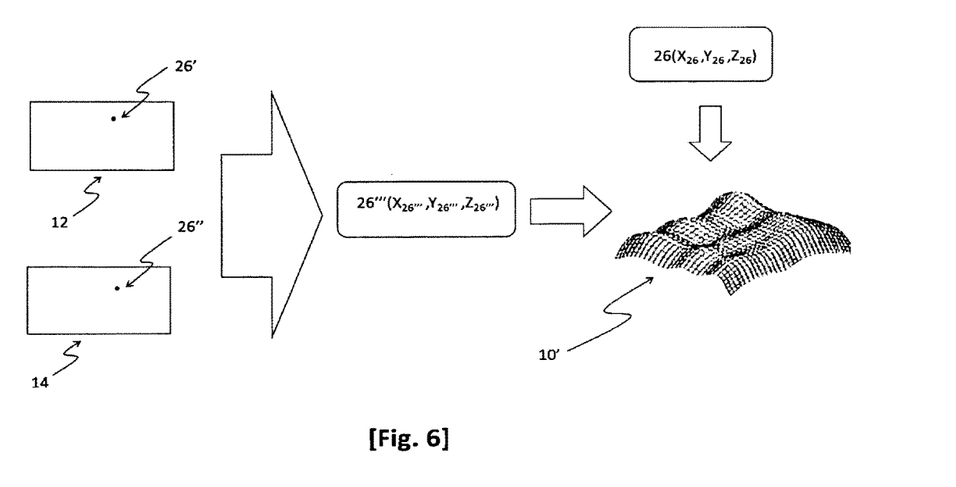
FIG. 6 is a schematic representation of obtaining the geometrically reset digital elevation model from two reference SAR images.

According to FIG. 6, the method for georeferencing the digital elevation model 10 finally comprises calculating the terrain coordinates of the at least one referencing point 26 by applying a conventional stereoscopic triangulation process applied to the at least two reference radar images 12, 14 from the at least one corrected link point 26', 26'' in each of the at least two reference SAR images 12, 14.

At the end of the conventional radar triangulation process from the at least one corrected link point 26', 26'' of the at least two reference SAR images 12, 14, at least one referencing point with 3D coordinates in the object space is obtained, the accuracy of which results from those of the localisation functions of the at least two reference SAR images 12, 14 used. This is referred to as at least one ground control point 26''' in accordance with the naming conventions in digital photogrammetry.

The comparison between the coordinates $X_{26}$, $Y_{26}$, $Z_{26}$ of the at least one referencing point 26 selected in the frame of reference of the digital elevation model 10 and the terrain coordinates $X_{26}'''$, $Y_{26}'''$, $226''$ of the at least one new triangulated point or ground control point 26''' that is, the terrain coordinates of the at least one referencing point, makes it possible to correct the deformations of the digital elevation model 10 by means of a transformation as a function of the deviations found and thus to increase the absolute accuracy of the digital elevation model 10. In other words, the comparison between the coordinates $X_{26}$, $Y_{26}$, $Z_{26}$ of the at least one selected referencing point 26 in the frame of reference of the digital elevation model 10 and the terrain coordinates $X_{26}'''$, $Y_{26}'''$, $Z_{26}''$ of the at least one new triangulated point or ground control point 26''' allows the digital elevation model 10 to be reset, and thus a new digital elevation model 10' including an improved absolute accuracy in comparison with the initial digital elevation model 10, to be obtained.

In the case of a homogeneous digital elevation model 10, obtained from a single interferometric or stereoscopic pair, the deviations induced by an imperfect estimation of the shooting conditions can be modelled locally by simple linear transformations, such as, for example and without limitation, a translation or a tilt. It is therefore possible, on the basis of the deviations observed between the coordinates $X_{26}$, $Y_{26}$, $Z_{26}$ of the at least one referencing point 26 selected in the frame of reference of the digital elevation model 10 and the coordinates $X2_6'''$, $Y2_6'''$, $Z2_6'''$, of the at least one ground control point 26''', to digitally estimate the parameters of this transformation by least squares minimisation. If the extent of the digital elevation model 10 is large and is the product of long term interferometric or stereoscopic acquisitions, the dynamic time course of the shooting parameters has to be taken into account, and a more complex transformation, polynomial for example, has to be considered.

In the case of a digital elevation model 10 resulting from a mosaic of elementary digital elevation models 10 from derived heterogeneous data, a transformation with more degrees of freedom, for example and without limitation, of the polynomial or spline type, has to be considered.

According to FIGS. 7 to 12, a non-limiting example of the method 100 for georeferencing the digital elevation model from three reference SAR images 312, 313, 314 is illustrated.

Figure 7:
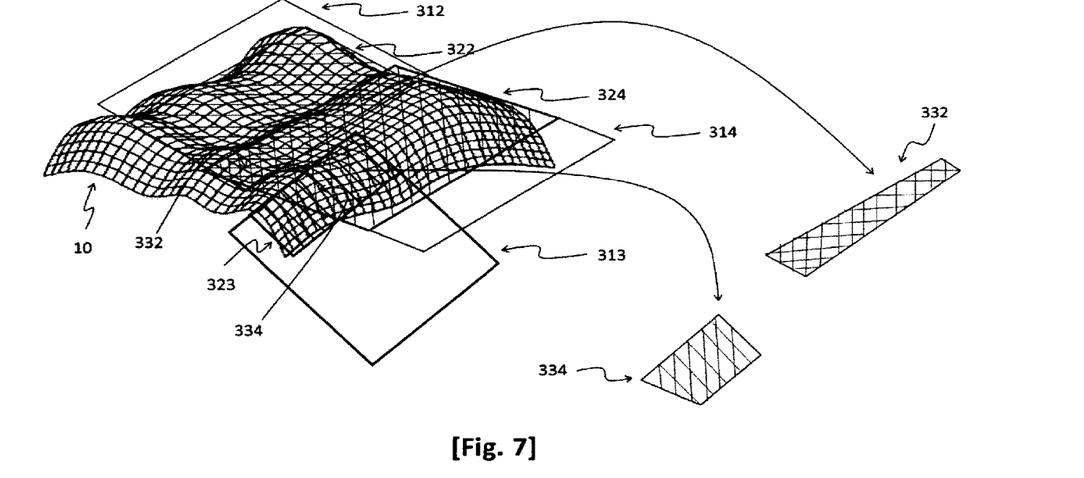
FIG. 7 is a schematic representation of two common zones of overlap between a digital elevation model and three reference SAR images according to a second embodiment of the invention.

To this end, according to FIG. 7, each of the three reference SAR images 312, 313, 314 comprises a zone 322, 323, 324 of overlap with the digital elevation model 10. Each of the three reference SAR images 312, 313, 314 includes a zone 332, 334 common to the zone 322, 323, 324 of overlap with the footprint of at least one other of the other images of the three reference SAR images 312, 313, 314 and with the digital elevation model 10. More particularly, according to FIG. 7, a first reference SAR image 312 includes a first common zone 332 with a second reference SAR image 314, said second reference SAR image 314 also comprising a second common zone 334 with a third reference SAR image 313.

Figure 8:
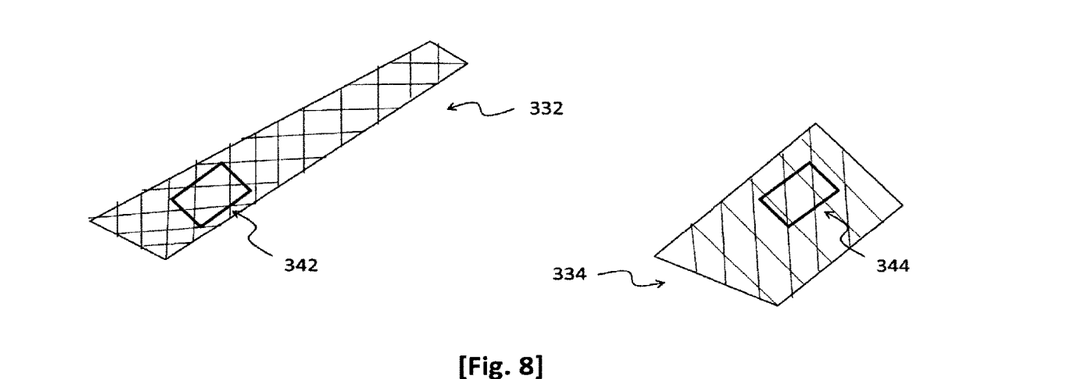
FIG. 8 is a schematic representation of selecting two areas of interest respectively on the two common zones of FIG. 7.

According to FIG. 8, an area of interest 342 has been selected on the digital elevation model 10 in the first common zone 332 between the zone of overlap 322 of the first reference SAR image 312 and the zone of overlap 324 of the second reference SAR image 314, another area of interest 344 has been selected on the digital elevation model 10 in the second common zone 334 between the zone of overlap 324 of the second reference SAR image 314 and the zone of overlap 323 of the third reference SAR image 313.

Figure 9:
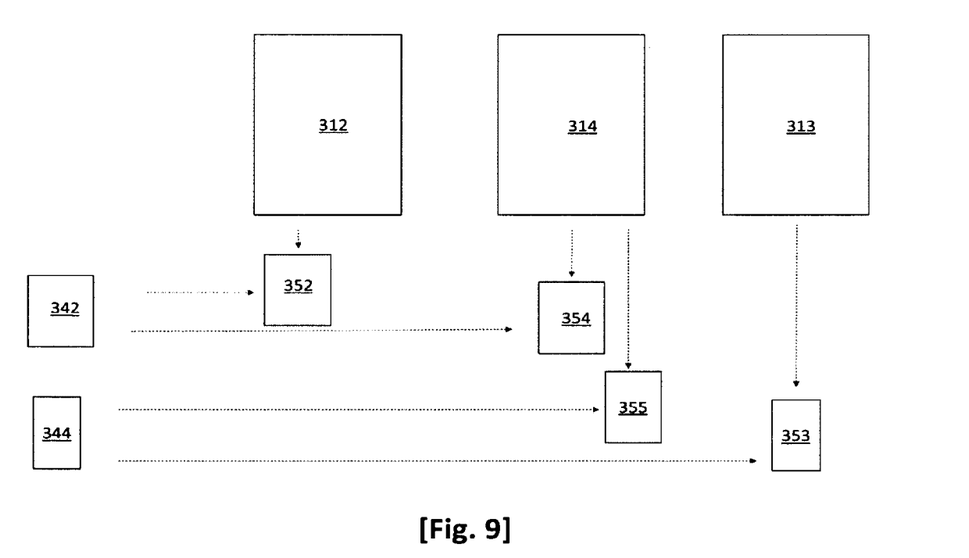
FIG. 9 is a schematic representation of obtaining simulated radar images from the two areas of interest selected in FIG. 8 and the three reference SAR images of FIG. 7.

According to FIG. 9, the acquisition parameters of the first reference SAR image 312 and the second reference SAR image 314 in combination with the area of interest 342 selected on the first common zone 332 allows the determination of a first simulated SAR image 352 and a second simulated SAR image 354 each corresponding to the first reference SAR image 312 and the second reference SAR image 314. The acquisition parameters of the second reference SAR image 314 and the third reference SAR image 313 in combination with the area of interest 344 selected on the second common zone 334 allows the determination of a third simulated SAR image 355 and a fourth simulated SAR image 353 each corresponding to the second reference SAR image 314 and the third reference SAR image 313. It should be noted that the second reference SAR image 314 comprises two separate simulated SAR images 354, 355, one from the first common zone 332, the other from the second common zone 334.

A geometric offset di,dj can be estimated between each of the simulated radar images 352, 353, 354, 355 and their corresponding reference radar image 312, 313, 314. In other words, according to this example, a first geometric offset di,dj can be estimated between the first simulated SAR image 352 and the first reference SAR image 312, a second geometric offset di', dj' can be estimated between the second simulated SAR image 354 and the second reference SAR image 314, a third geometric offset di", dj" can be estimated between the third simulated SAR image 355 and the second reference SAR image 314, and a fourth geometric offset di''', dj''' can be estimated between the fourth simulated SAR image 353 and the third reference SAR image 313.

Figure 10:
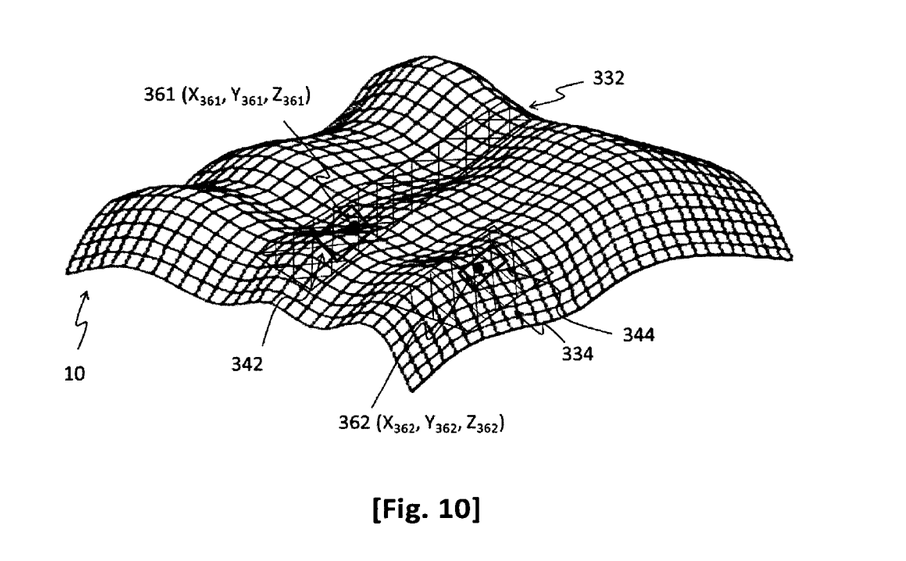
FIG. 10 is a schematic representation of selecting two referencing points respectively on the two areas of interest selected in FIG. 8.

According to FIG. 10, the selection of a first referencing point 361, on the selected area of interest 342 in the first common zone 332 and the selection of a second referencing point 362, on the selected area of interest 344 in the second common zone 334 are represented. According to FIG. 10, the first referencing point 361 selected on the digital elevation model 10 includes 3D coordinates $X_{361}$, $Y_{361}$, $Z_{361}$ relating to the frame of reference of the digital elevation model 10, and the second referencing point 362 selected on the digital elevation model 10 includes 3D coordinates $X_{362}$, $Y_{362}$, $Z_{362}$ relating to the frame of reference of the digital elevation model 10.

Figure 11:
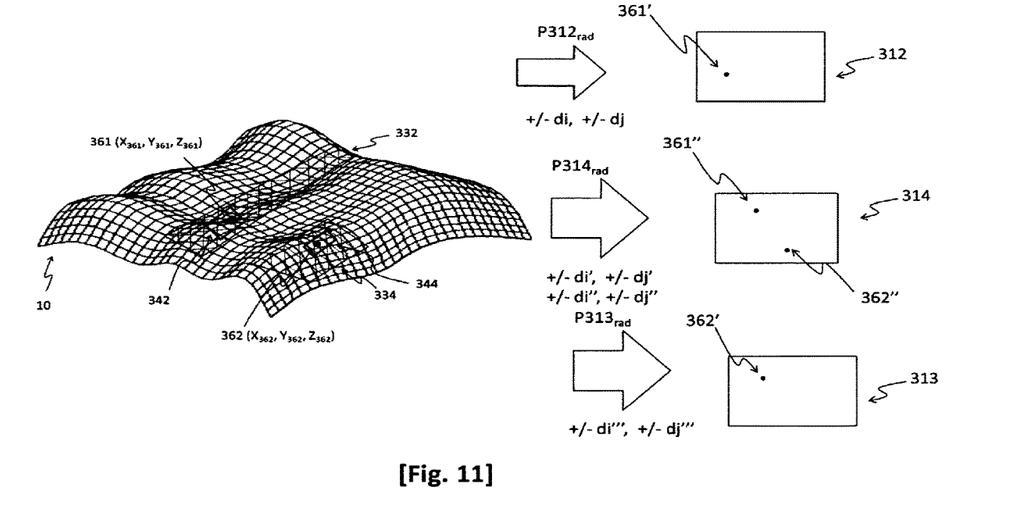
FIG. 11 is a schematic representation of determining two pairs of link points distributed in the three reference radar images by projecting the two referencing points of FIG. 10.

According to FIG. 11, three radar projection functions $P312_{rad}$, $P314_{rad}$, $P313_{rad}$ associated with the three reference SAR images 312, 314, 313 each allow the projection of the referencing point(s) 361, 362 into the reference SAR image 312, 314, 313 associated with the radar projection function $P312_{rad}$, $P314_{rad}$, $P313_{rad}$. More particularly, the first referencing point 361 is projected into the first reference SAR image 312 and into the second reference SAR image 314 according to a first radar projection function $P312_{rad}$ and a second radar projection function $P314_{rad}$ respectively; the second referencing point 362 is projected into the second reference SAR image 314 and into the third reference SAR image 313 according to the second radar projection function $P314_{rad}$ and a third radar projection function $P313_{rad}$ respectively. The three radar projections $P312_{rad}$, $P314_{rad}$, $P313_{rad}$ make it possible to determine four link points, a first pair of link points corresponding to the first referencing point 361 projected into the first and second reference SAR images 312, 314, and a second pair of link points corresponding to the second referencing point 362 projected into the second and third reference SAR images 314, 313.

According to FIG. 11, applying the geometric offset di,dj, di', dj', di", dj", di''', dj''' of each of the four simulated SAR images 352, 353, 354, 355 relative to each of their corresponding reference SAR images 312, 313, 314, to the coordinates of the radar link point(s) in each of the three reference SAR images 312, 313, 314 makes it possible to obtain corrected coordinates of the link points, called corrected radar link points 361', 361", 362', 362" in each of the three reference SAR images 312, 313, 314 necessary for the method for georeferencing the digital elevation model 10. More particularly, the first reference SAR image 312 comprises a first corrected link point 361' derived from the radar projection of the first referencing point 361 and the geometric correction di,dj between the first simulated SAR image 352 and the first reference SAR image 312, the second reference SAR image 314 comprises a second corrected link point 361" derived from the radar projection of the first referencing point 361 and the geometric correction di', dj' between the second simulated SAR image 354 and the second reference SAR image 314. The second reference SAR image 314 also comprises a third corrected link point 362" derived from the radar projection of the second referencing point 362 and the geometric correction di", dj" between the third simulated SAR image 355 and the second reference SAR image 314. Finally, the third reference SAR image 313 comprises a fourth corrected link point 362' derived from the radar projection of the second referencing point 362 and the geometric correction di''', dj''' between the fourth simulated SAR image 353 and the third reference SAR image 313.

Figure 12:
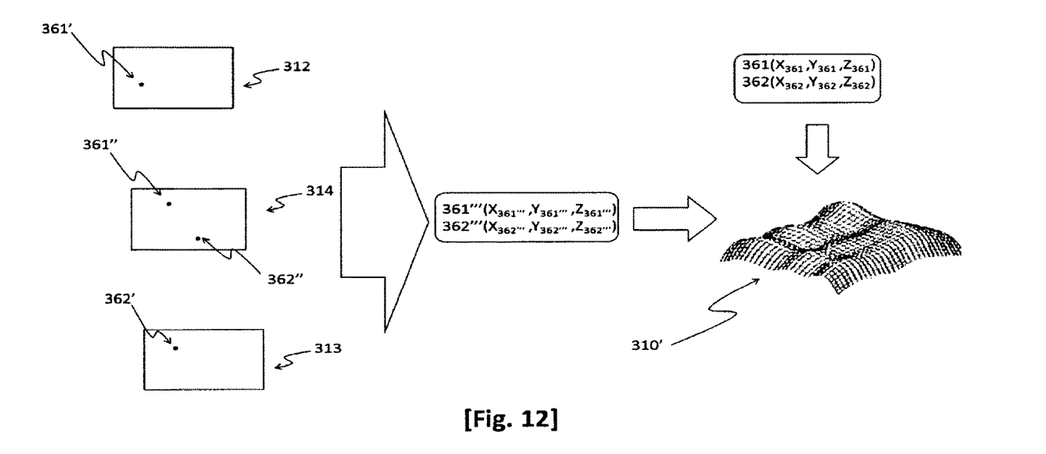
FIG. 12 is a schematic representation of obtaining the geometrically reset digital elevation model from three reference radar images.

According to FIG. 12, the method for georeferencing the digital elevation model 10 finally comprises calculating the terrain coordinates of the first referencing point 361 and the second referencing point 362 by applying the conventional stereoscopic triangulation process to the three reference radar images 312, 313, 314 from the two pairs of corrected link point 361', 361", 362', 362".

At the end of the conventional radar triangulation process from the two pairs of corrected link points 361', 361", 362', 362", two referencing points with 3D coordinates in the object space whose accuracy results from those of the localisation functions of the three reference SAR images 312, 313, 314 used are obtained. These are referred to as ground control points 361'''', 362''' in accordance with the naming conventions in digital photogrammetry.

The comparison between the coordinates $X_{361}$, $Y_{361}$, $Z_{361}$, $X_{362}$, $Y_{362}$, $Z_{362}$ of the two selected referencing points 361, 362 in the frame of reference of the digital elevation model 10 and the terrain coordinates $X_{361'''}$, $Y_{361'''}$, $Z_{361'''}$, $X_{362'''}$, $Y_{362'''}$, $Z_{362'''}$ of the two new triangulated points or ground control points 361''', 362''', allow the deformations of the digital elevation model 10 to be corrected by a transformation as a function of the deviations found and thus the absolute accuracy of the digital elevation model 10 to be increased.

In other words, the comparison between the coordinates $X_{361}$, $Y_{361}$, $Z_{361}$, $X_{362}$, $Y_{362}$, $Z_{362}$ of the two selected referencing points 361, 362 in the frame of reference of the digital elevation model 10 and the terrain coordinates $X_{361'''}$, $Y_{361'''}$, $Z_{361'''}$, $X_{362'''}$, $Y_{362'''}$, $Z_{362''''}$ of the two new triangulated points or ground control points 361''', 362''' allows the digital elevation model 10 to be reset, and thus a new digital elevation model 310' is obtained including an improved absolute accuracy compared to the initial digital elevation model 10.

According to another example, implementing three reference SAR images, and not represented by a figure, the three reference SAR images are obtained so that their zone of overlap has a zone common to the three reference SAR images. According to this example, any area of interest selected in this common zone results in calculating a simulated SAR image per reference SAR image on the common zone and according to the acquisition parameters of each reference SAR image. According to this same example, any referencing point selected on this common zone in the digital elevation model is projected into the three reference SAR images and to obtain a link point for each of the three reference SAR images. And applying the geometric offset calculated from the simulated SAR image and its reference SAR image to each link point in that image results in a corrected radar link point.

Finally, it is also conceivable to perform the method with a set of reference SAR images that have both zones common to their zone of overlap with the digital elevation model in twos and common zones with more than two images.

The above examples illustrate the flexibility of using the method for referencing a digital elevation model as a function of the number and geographic distribution of the reference SAR images available to perform referencing. The multiplicity of possible configurations between the number of zones common to the reference SAR images, the number of areas of interest per common zone and the number of selected referencing points makes it possible to obtain as many corrected link points in each SAR image used, which result in as many reset terrain coordinates making it possible to refine the accuracy of the final referencing of the digital elevation model.

Figure 13:
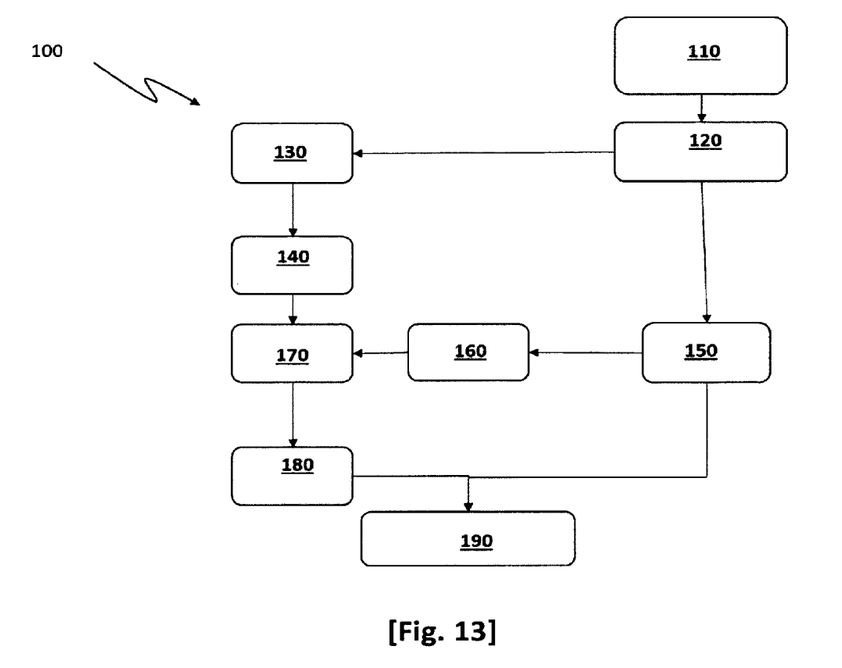
FIG. 13 is an example of a flowchart of the method for georeferencing a digital elevation model according to the invention.

According to FIG. 13, the method 100 for georeferencing a digital elevation model 10 described in FIGS. 1 to 12 above may, for example and without limitation, comprise a plurality of steps.

The method 100 shall comprise a step of obtaining 110 at least two reference SAR images 12, 14, the footprint of each reference SAR image 12, 14 including a zone 15 common to the zone 16, 17 of overlap with the footprint of at least one other of the at least two reference SAR images 12, 14 and with the digital elevation model 10.

Each of the at least two reference SAR images 12, 14 thus includes a zone 16, 17 of overlap with the digital elevation model 10. In other words, the footprint of each of the at least two reference SAR images 12, 14 covers, in whole or in part, the terrain surface represented by the digital elevation model 10 so that a zone of overlap 16 corresponding to the intersection between the footprint of a reference SAR image 12 and the geographical zone covered by the digital elevation model 10 is defined.

The method further includes, for each reference SAR image 12, 14 obtained, the following steps: selecting 120 at least one area of interest 18 on the common zone 15; calculating 130 a simulated radar image 22 on the at least one selected area of interest 18 from the acquisition parameters of the reference SAR image 12; estimating 140 a geometric offset di,dj between the simulated radar image 22 and the reference radar image 12.

The method 100 then comprises the following steps: selecting 150 at least one referencing point 26 on the at least one selected area of interest 18 from the digital elevation model 10, the at least one referencing point 26 including coordinates $X_{26}$, $Y_{26}$, $Z_{26}$ according to the frame of reference of the digital elevation model 10; projecting 160 said at least one referencing point 26 into each of the at least two reference SAR images 12, 14 by a radar projection function $P1_{rad}$, $P2_{rad}$ relating to each image so as to obtain at least one radar link point relating to each of the at least two reference SAR images 12, 14; correcting 170 the at least one radar link point of each of the at least two reference SAR images 12, 14 by applying said geometric offset di,dj estimated for each of the reference SAR images 12, 14 so as to obtain at least one corrected radar link point 26', 26" relating to each reference SAR image 12, 14; calculating 180 the reset terrain coordinates $X_{26}'''$, $Y_{26}'''$, $Z_{26}'''$ of the at least one referencing point 26 selected according to a triangulation process of the at least one corrected link point 26', 26" relating to each reference SAR image 12, 14; and georeferencing 190 the digital elevation model 10 by transformation as a function of the deviations found between the reset terrain coordinates $X_{26}'''$, $Y_{26}'''$, $Z_{26}'''$ and the terrain coordinates $X_{26}$, $Y_{26}$, $Z_{26}$ in the frame of reference of the digital elevation model 10.

Depending on the digital elevation model 10, that is, depending on whether the digital elevation model 10 is of the homogeneous or heterogeneous type, it will be suitable to adapt the transformation to be applied, that is, either a transformation of the simple linear type, such as, for example and without limitation, by translation, by tilt or by rotation, or else a transformation having more degrees of freedom, for example and without limitation, of the polynomial equation type representing a soft surface or of the spline type.

Alternatively, the digital elevation model 10 may be derived from an interferometric pair of synthetic aperture radar images and one of the images of this interferometric pair is chosen during step 110 of obtaining at least two reference SAR images 12, 14. In this particular case, it is possible, optionally, to limit the method steps 130 to 140 only to the other reference radar images 14 of the at least two reference radar images 12, 14 obtained, that is, the reference SAR images 14 not constituting the interferometric pair. Indeed, for digital elevation models 10 obtained by radar interferometry, the offset between a simulated SAR image 22 and a reference SAR image 12 constituting the interferometric pair being a priori zero, it is not necessary to carry out the steps of the method 100 corresponding to calculating the simulated SAR image 22 and estimating the offset between the simulated SAR image 22 and the reference SAR image 12 for this reference SAR image 12. According to this optional embodiment, the step of correcting 170 the at least one radar link point of the reference SAR image 12 constituting the interferometric pair consists in applying a zero geometric offset di,dj in order to obtain the at least one corrected radar link point for this image.

Figure 14:
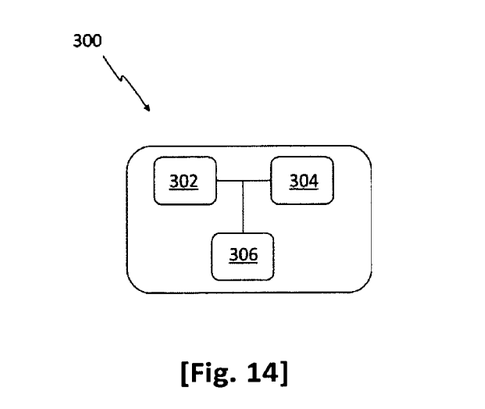
FIG. 14 is a schematic representation of an example of a system for implementing the method for georeferencing a digital elevation model according to FIG. 13.

According to FIG. 14, a system 300 for implementing the method 100 for georeferencing a digital elevation model 10 may comprise an information processing unit 302 of the processor type, such as, for example and without limitation, a processor specialised in signal processing, or a microcontroller, or any other type of circuit enabling software-type instructions to be executed. The system 300 also includes random access memory 304 associated with the information processing unit 302. The information processing unit 302 is configured to execute a program, also called a computer program, comprising instructions implementing the method 100 for georeferencing a digital elevation model 10 described above. The instructions are loaded into the random-access memory of the system 300 from any type of storage media 306 such as, for example and without limitation, a non-volatile type memory or an external memory such as a removable storage memory card. The instructions may also be loaded via a connection to a communication network.

Alternatively, the computer program, comprising instructions implementing the method 100 for georeferencing a digital elevation model may also be implemented in hardware form by a machine or by an application-specific integrated circuit or by an electronic circuit of the programmable logic array type.

It should be understood that the detailed description of the object of the invention, which is given solely by way of illustration, does not in any way constitute a limitation, the technical equivalents also being included in the scope of the present invention.

The invention claimed is:

1. A method for georeferencing a digital elevation model of a surface of Earth, the method comprising a first step of:
obtaining at least two synthetic aperture radar images which are reference radar images, wherein a footprint of each of the reference radar images includes a common zone common to an overlap zone of overlap with a footprint of at least one other of the at least two reference radar images and with the digital elevation model;
the method further including, for each of the reference radar images, steps of:
selecting at least one area of interest on the common zone;
calculating a simulated radar image on the at least one selected area of interest from acquisition parameters of the reference radar images;

estimating a geometric offset between the simulated radar image and at least one of the reference radar images;

the method further comprising:

selecting at least one referencing point on the at least one selected area of interest from the digital elevation model, the at least one referencing point including terrain coordinates in a frame of reference of the digital elevation model, projecting said at least one referencing point into each of the at least two reference radar images by a radar projection function relating to each of the reference radar image to obtain at least one radar link point relating to each of the at least two reference radar images;

correcting the at least one radar link point of each of the at least two reference radar images by applying said geometric offset estimated for each of the reference radar images to obtain at least one corrected radar link point relating to each reference radar images;

calculating reset terrain coordinates of the at least one referencing point by applying a triangulation process implementing said at least two reference radar images from the at least one corrected link point relating to each reference radar image; and georeferencing the digital elevation model by transformation as a function of deviations between the reset terrain coordinates and the terrain coordinates in the frame of reference of the digital elevation model.

2. The method according to claim 1, wherein the step of estimating the geometric offset between the simulated radar image and the at least one reference radar image comprises maximizing a conditional probability of the geometric offset based on the at least one reference radar image.

3. The method according to claim 1, wherein the step of calculating the simulated radar image comprises determining an average reflectance factor of the at least one reference radar image calculated on the area of interest considered for calculating said simulated SAR image.

4. The method according to claim 1, wherein each selected area of interest represents a restricted zone of the common zone.

5. The method according to claim 1, wherein the step of selecting at least one area of interest is a selection of at least one zone of interest per fifty kilometer interval, along a North-South axis.

6. The method according to claim 1, wherein during the step of obtaining at least two reference radar images, radar images acquired by any synthetic aperture radar satellite in opposite viewing directions are selected.

7. The method according to claim 1, further comprising deriving the digital elevation model from an interferometric pair of synthetic aperture radar images and in that one of the images of the interferometric pair is chosen during the step of obtaining at least two reference radar images.

8. The method according to claim 7, wherein:

the steps of calculating the simulated radar image and of estimating the geometric offset relate only to the other reference radar images of the at least two reference radar images;

in that the step of correcting the at least one radar link point of the reference radar image corresponds to one of the images of the interferometric pair includes a zero geometric offset.

9. A system for georeferencing a digital elevation model for implementing the method of claim 1, wherein the system includes:

an information processing unit and a random-access memory associated with the information processing unit, said random access memory including instructions for implementing the method, said information processing unit configured to execute the instructions implementing the method of claim 1.

10. A computer program product comprising instructions which, when the program is executed by a computer, cause the computer to implement the steps of the method of claim 1.

11. An information storage medium storing a computer program comprising instructions for implementing, by a processor, the method of claim 1, when said program is read and executed by said processor.

* * * * *